Patented Dec. 13, 1949

2,491,459

UNITED STATES PATENT OFFICE 2,491,459

PRODUCTION OF CYANURIC CHLORIDE

Jack T. Thurston, Riverside, Conn., assignor to American Cyanamid Company, New York, N. Y., a corporation of Maine No Drawing. Application January 16, 1945, Serial No. 573,143

5 Claims. (Cl. 260—248)

This invention relates to the preparation of cyanuric chloride by means of the vapor phase polymerization of cyanogen chloride over charcoal as a catalyst.

Cyanuric chloride previously has been prepared by means of the liquid phase polymerization of cyanogen chloride in a solvent. It has been found that such methods entail the use of cumbersome and somewhat hazardous systems for the recovery of cyanuric chloride. In order to obtain a pure product by means of this prior method, it is necessary to wash the crude cyanuric chloride with fresh solvent and either recrystallize or distill to purify the crude solid.

It has been discovered that cyanogen chloride will polymerize to cyanuric chloride in the presence of charcoal when the reaction chamber containing the charcoal and cyanogen chloride is heated to above the boiling point, 190° C., and below the decomposition point of cyanuric chloride. It has also been discovered that yields are increased if the charcoal carries an acid chloride material, such as hydrogen chloride, one or more group II metal chlorides, or a mixture thereof.

There are several advantages arising from the use of this newly discovered vapor phase method of polymerizing cyanuric chloride which are not obtained in earlier methods. For instance, the hazards previously encountered in handling the reaction mixtures obtained from liquid phase polymerizations are eliminated. Again, the vapor phase preparation of cyanuric chloride is more economical and large amounts of product of good purity are obtained as a result of this discovery because the cumbersome steps of filtration, washing, recrystallization and/or distillation are no longer necessary for the isolation and recovery of cyanuric chloride.

In the present method, the cyanogen chloride vapors pass into the reaction chamber containing the charcoal catalyst and the cyanuric chloride vapors issue, condense and solidify to yield a product of good purity.

Neither cyanogen chloride nor a mixture of cyanogen chloride with hydrogen chloride or a group II metal chloride polymerize to cyanuric chloride when heated above 190° C. in the absence of charcoal. However, upon the introduction of charcoal into the reaction chamber, polymerization takes place to yield cyanuric chloride.

This invention contemplates the polymerization at a temperature above the boiling point of cyanuric chloride. There are several reasons for this minimum polymerization temperature. The polymerization of cyanogen chloride has been found to take place under various conditions at temperatures from its boiling point to that of cyanuric chloride. A polymerization taking place over charcoal below the melting point of cyanuric chloride plugs up the reaction chamber with solid cyanuric chloride and renders continued operation of the process hazardous. A polymerization taking place over charcoal between the melting point and boiling point of cyanuric chloride results in the coating of the surface of the charcoal with liquid cyanuric chloride, which greatly reduces the effective surface of the catalyst. This reduction in surface area is believed to be responsible for a low percentage conversion and/or yield of cyanuric chloride. Because of the high vapor pressure of liquid cyanuric chloride, it is possible, but not practical, to run the polymerization between the melting point and boiling point of cyanuric chloride by diluting the cyanogen chloride vapors with air which serves to sweep the vapors of cyanuric chloride away from the charcoal catalyst and out of the reaction chamber. The air also tends to carry some of the cyanuric chloride vapors out of the receiver through the vent pipe and reduce the recovery of product. Thus, it is seen that the reaction should be maintained above the boiling point of cyanuric chloride.

Two types of preparation were used in developing the vapor phase method of preparing cyanuric chloride to its present high level of productivity. In order that there be no ambiguity, these two types of prepartion will be described.

A "single pass" preparation is one in which a given amount of cyanogen chloride is passed through the reaction chamber over the charcoal catalyst. After completing this pass, the heating is discontinued so that the reaction chamber cools to approximately room temperature at which point the receiver is opened to remove the cyanuric chloride. The charcoal catalyst may or may not be replaced, as desired, upon completion of a single pass.

A "recycling" process is one in which any unpolymerized cyanogen chloride is returned to the reaction chamber either alone or mixed with additional cyanogen chloride so that the conversion to cyanuric chloride will reach an optimum figure.

It was discovered that the yield of cyanogen chloride is increased if the charcoal carries an acid chloride substance, such as hydrogen chloride, one or more group II metal chlorides or a mixture thereof. The results of single pass runs showing the effectiveness of charcoal alone and with typical group II metal chlorides in wide ranges of concentration and temperature are recorded in the table. The optimum yields were obtained by impregnating charcoal with a group II metal chloride solution of 3.75% to 5.0%. The reason for the increase in yield in successive single pass runs reusing the same catalyst is believed to be because the charcoal catalyst becomes saturated with adsorbed cyanogen chloride and/or cyanuric chloride after completing the first single pass. The recovery of cyanuric chloride is substantially complete after the saturation is accomplished.

In the table and the examples the parts are by weight.

Table

| Run No. | Catalyst | Parts of CNCl | Temp. Range, °C. | Percent Yield of cyanuric chloride per "Single Pass" |
|---|---|---|---|---|
| 140A | Charcoal only | 180 | 309–438 | 37.2 |
| 140B | Continuation of #140A | 120 | 304–407 | 74.2 |
| 140C | Continuation of #140B | 180 | 268–396 | 70.0 |
| 114 | 2.5% CaCl₂ on charcoal | 120 | 238–264 | 20.0 |
| 121A | 3.75% CaCl₂ on charcoal | 120 | 253–306 | 37.5 |
| 121B | Continuation of #121A | 240 | 219–277 | 46.8 |
| 120A | 5.0% CaCl₂ on charcoal | 120 | 248–322 | 32.5 |
| 120B | Continuation of #120A | 120 | 250–278 | 39.2 |
| 110 | 7.5% CaCl₂ on charcoal | 120 | 275–322 | 30.5 |
| 109A | 22.8% CaCl₂ on charcoal | 86 | 226–286 | 21.5 |
| 109B | Continuation of #109A | 120 | 260–296 | 29.2 |
| 112 | 30% CaCl₂ on charcoal | 120 | 237–275 | 18.3 |
| 139A | 3.75% CaCl₂ on charcoal | 120 | 253–464 | 0.0 |
| 139B | Continuation of #139A | 120 | 274–458 | 83.5 |
| 139C | Continuation of #139B | 120 | 289–466 | 80.7 |
| 139D | Continuation of #139C | 120 | 295–454 | 87.5 |
| 33A | 3.75% MgCl₂ on charcoal | 120 | 306–468 | 13.3 |
| 33B | Continuation of #33A | 120 | 331–454 | 76.5 |
| 33C | Continuation of #33B | 240 | 294–509 | 78.0 |
| 35A | 3.75% BaCl₂ on charcoal | 180 | 275–486 | 35.0 |
| 35B | Continuation of #35A | 300 | 255–466 | 87.5 |
| 36A | 3.75% SrCl₂ on charcoal | 180 | 324–475 | 36.6 |
| 36B | Continuation of #36A | 300 | 248–480 | 87.7 |
| 142 | 3.75% ZnCl₂ on charcoal | 480 | 289–482 | 39.8 |

A single pass preparation of cyanuric chloride from cyanogen chloride in the presence of a hydrogen chloride-charcoal catalyst is shown in the following example.

*Example 1*

During a 4.5-hour period, a gaseous mixture containing 356 parts of cyanogen chloride and 19 parts of hydrogen chloride is passed into a reaction chamber containing charcoal at a temperature of 240–400° C. The amount of cyanogen chloride which is recovered is 175 parts and the amount of cyanuric chloride obtained is 157 parts. This corresponds to a conversion of 44.1% and a yield of 86.7%, based on the amount of cyanogen chloride consumed.

The previous example and table show the preparation of cyanuric chloride by means of the single pass method. The following examples show a process which recycles unpolymerized cyanogen chloride together with fresh additions of cyanogen chloride. In both of these examples the charcoal catalyst is untreated.

*Example 2*

During a 17.25-hour reaction period, 711 parts of cyanogen chloride are fed into a reaction chamber containing charcoal at a temperature of 240–355° C. The recovery of cyanogen chloride is 31 parts and the amount of cyanuric chloride produced is 570 parts. This corresponds to a conversion of 80.1% and a yield of 83.8%.

*Example 3*

During a 32.75-hour period, 1,043 parts of cyanogen chloride are fed into a reaction chamber containing charcoal at a temperature of 205–405° C. The recovery of cyanogen chloride is 9.7 parts and the amount of cyanuric chloride produced is 965.5 parts. This corresponds to a conversion of 92.5% and a yield of 93.5%.

If it is desirable, cyanuric chloride can be prepared in a finely divided state by this vapor phase method. This is accomplished by keeping the receiver at a temperature below the melting point of cyanuric chloride and above the boiling point of cyanogen chloride so that the vapors coming from the reaction chamber are cooled quickly to give a finely divided crystalline solid uncontaminated with cyanogen chloride.

Cyanuric chloride prepared by vapor phase polymerization can be used without further purification in the preparation of chemical intermediates, chemotherapeutic agents, insecticides, dyes, synthetic resins, plastics and other materials in which a symmetrical triazine structure is desirable.

While the invention has been described with particular reference to specific embodiments, it is to be understood that it is not to be limited thereto but is to be construed broadly and restricted solely by the scope of the appended claims.

What is claimed:

1. A method of preparing cyanuric chloride which includes the steps of passing cyanogen chloride over charcoal at a temperature of at least 205° C. and until the charcoal becomes saturated with a material chosen from the group consisting of adsorbed cyanogen chloride, cyanuric chloride and a mixture thereof, thereafter continuing the passage of cyanogen chloride over the charcoal under the above temperature conditions, and recovering the cyanuric chloride.

2. A method of preparing cyanuric chloride which includes the steps of passing cyanogen chloride over charcoal which carries a chloride of the formula $RCl_x$, in which R is chosen from the group consisting of hydrogen and the metals of Group II of the Periodic Arrangement of the Elements and $x$ is a whole number, at a temperature of at least 205° C. and until the charcoal becomes saturated with a material chosen from the group consisting of adsorbed cyanogen chloride, cyanuric chloride and a mixture thereof, thereafter continuing the passage of cyanogen chloride over the charcoal under the above temperature conditions, and recovering the cyanuric chloride.

3. The method of claim 2 in which R is hydrogen.

4. The method of claim 2 in which R is calcium.

5. The method of claim 2 in which R is magnesium.

JACK T. THURSTON.

REFERENCES CITED

The following references are of record in the file of this patent:

UNITED STATES PATENTS

| Number | Name | Date |
|---|---|---|
| 1,934,896 | Wagner | Nov. 14, 1933 |
| 1,989,042 | Kunz | Jan. 22, 1935 |
| 2,391,490 | Thurston et al. | Dec. 25, 1945 |
| 2,414,655 | Metcalfe | Jan. 21, 1947 |
| 2,419,488 | Dutcher | Apr. 22, 1947 |

FOREIGN PATENTS

| Number | Country | Date |
|---|---|---|
| 399,464 | Canada | 1941 |

OTHER REFERENCES

Catalysis by Berkman, p. 456.